Nov. 7, 1961  G. C. ROBERTS  3,007,209
METHODS OF VULCANIZING OUTSOLES ONTO SHOE BOTTOMS
Filed April 28, 1959
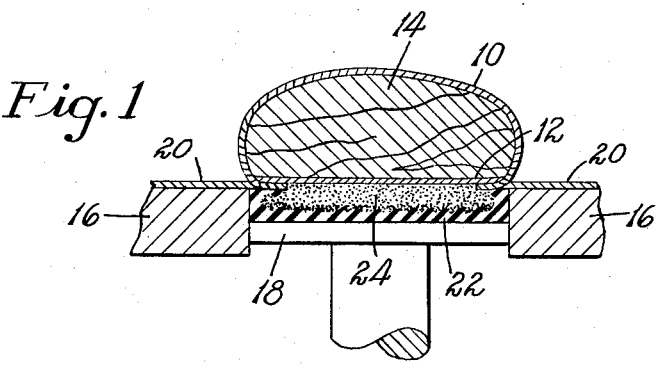
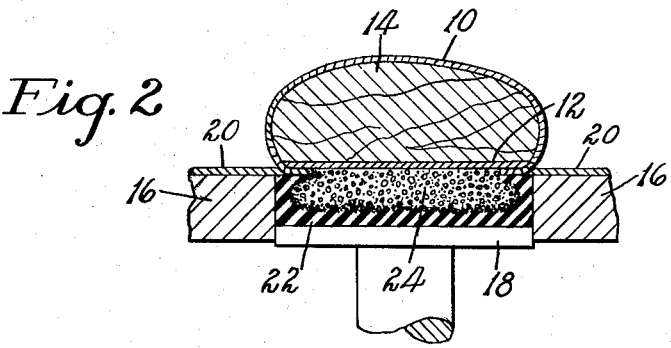
Inventor
Gerald C. Roberts
By his Attorney 3,007,209
METHODS OF VULCANIZING OUTSOLES ONTO SHOE BOTTOMS
Gerald Charles Roberts, Leicester, England, assignor to United Shoe Machinery Corporation, Flemington, N.J., a corporation of New Jersey
Filed Apr. 28, 1959, Ser. No. 809,431
Claims priority, application Great Britain May 12, 1958
5 Claims. (Cl. 18—59)

This invention relates to the manufacture of shoes and is herein illustrated in its application to the manufacture of shoes having rubber outsoles vulcanized thereon.

Vulvanized rubber outsoles may be divided into two categories, first, soles characterized by a dense, firm, non-cellular structure and second, soles, such, for example as sponge rubber soles characterized by a soft, resilient, cellular structure of relatively low specific gravity.

It is an object of the present invention to provide a method of molding and vulcanizing onto shoe bottoms soles which will have, at least to some degree, the desirable characteristics of soles of both categories above referred to—that is, soles characterized by a dense, firm, non-cellular, outer or skin structure and characterized by a relatively soft resilient cellular inner structure.

With the above object in view the present invention consists in a method of making shoes which comprises placing in the mold cavity of a machine for molding and vulcanizing outsoles onto shoe bottoms a charge of rubber composition including a suitable blowing agent. A sole vulcanizing machine suitable for use in practising the method of the present invention is disclosed in an application for United States Letters Patent Serial No. 781,138, filed December 17, 1958, in the names of Eldred and Frampton. Vulcanizing temperature is applied to the charge while the charge is held against expansion during an initial period—preferably about three minutes. This initial period is sufficient in duration to cause the decomposition of the blowing agent in those portions of the charge adjacent to the walls and the base of the mold cavity without any significant expansion of those portions of the charge and sufficient in duration to raise the temperature of the inner porion of the charge to a degree sufficient for at least partial decomposition of the blowing agent but insufficient in duration to cause any considerable alteration in the moldable character of the charge. At the end of said initial period the mold cavity is enlarged heightwise of a shoe in the machine, for example by a measured downward movement of the sole mold member thus to permit the blowing agent in the inner portion of the charge to expand thereby to form a cellular structure in said inner portion. The expansion of the inner portion of the charge enlarges the entire charge including the outer portion or skin causing it to fill the enlarged mold cavity while still maintaining the relatively dense impervious non-cellular structure of the outer or skin portion of the charge.

The invention will now be described with reference to the accompanying drawings and pointed out in the appended claims.

In the drawings,

FIG. 1 is a sectional view illustrating the mold elements of a machine for vulcanizing soles onto shoe bottoms, a lasted shoe mounted on the side mold members and a rubber sole partially vulcanized in the mold cavity; and FIG. 2 is a cross section similar to FIG. 1 showing the sole at a later stage in the vulcanizing process.

The invention is herein illustrated and described as embodied in a method of molding and vulcanizing sole and heel units onto shoe bottoms. In practising the method I prefer to employ a sole vulcanizing machine of the type illustrated and described in the Eldred et al. application for United States Letters Patent hereinbefore referred to.

In practising the method illustrated in the drawings, a shoe upper 10 lasted to an insole 12 is mounted on a shoe form 14 of the machine. A charge of suitable unvulcanized rubber composition is then placed in the cavity formed by two side mold members 16 and a sole mold member 18. Preferably, the charge is a blank roughly shaped to the peripheral contour of the shoe bottom and generally uniform in thickness.

A composition suitable for use in practising the method of the present invention is as follows:

| | Parts by weight |
|---|---|
| Smoked sheet (natural rubber) | 80 |
| Butadiene styrene copolymer 15/85 | 20 |
| Stearic acid | 3.0 |
| Antioxidant | 0.5 |
| Manosil VN3 (finely divided silica) | 10.0 |
| Pigment | 6.0 |
| Triethanol amine | 6.25 |
| Mercaptobenzo thiazole | 0.67 |
| Diphenyl guanidine | 1.2 |
| Tetramethyl thiuram disulphide | .05 |
| Sulphur | 2.0 |
| Zinc oxide | 3.0 |
| Peptizer | 0.25 |
| Genitron O.B. (blowing agent) | 0.5 |

In order to provide for the additional thickness at the heel portion of the sole and heel unit a small blank of unvulcanized rubber composition which does not have the blowing agent incorporated therein is placed on the heel portion of the larger blank.

The lasted shoe mounted on the form 14 is then moved downwardly into its position illustrated in the drawings and the side mold members are advanced to bring the crease plates 20 into contact with the upper 10. Vulcanizing heat is then applied to the charge in the mold cavity and the bottom or sole mold member 18 is moved upwardly into its position illustrated in FIG. 1 to press the charge into intimate contact with the shoe bottom. After about three minutes the outer portion of the charge is partially vulcanized to form a relatively dense or non-cellular outer portion or skin 22 of substantial thickness. The inner portion 24 during this stage in the vulcanizing process is not heated to vulcanizing temperature. During this stage the position of the sole mold member 18 is such that decomposition of the blowing agent is not accompanied by any significant expansion of the charge and consequently no visible porosity occurs in the outer portion of the charge.

After the expiration of the initial three minute period the sole member 18 is moved downwardly into its position illustrated in FIG. 2 while vulcanizing temperature is maintained in the mold cavity. During the second stage in the vulcanizing operation the inner portion 24 of the charge is expanded by the blowing agent thus providing a product having a multiplicity of interconnected cells. At this stage in the process the outer portion or skin 22 is still sufficiently plastic and moldable to permit its vertical dimension to be increased by an increment corresponding to the difference between the vertical positions of the sole mold member in FIGS. 1 and 2. In the process as illustrated in the drawings, the sole mold member 18 is moved downwardly to an extent such that when the inner portion 24 has expanded sufficiently to cause the charge to fill the mold cavity the specific gravity of the charge is approximately .95 as compared with a specific gravity of approximately 1.05 of the unvulcanized charge. The specific gravity of a rubber mixture commonly used in the manufacture of shoe soles is about 1.2.

After the downward movement of the sole mold member from its position in FIG. 1 into its position in FIG. 2 is effected, the application of heat is continued for about seven minutes to complete the vulcanizing process. Upon the completion of the vulcanizing cycle a suitable timing mechanism causes the side mold members 16 to move away from each other and causes the shoe form 14 to move upwardly away from the mold cavity. The resulting shoe has a sole and heel unit comprising an outer portion or skin which is relatively dense and an inner portion comprising a multiplicity of interconnected cells. The illustrated sole is suitable for hard usage in outdoor wear while at the same time providing a high degree of comfort to the wearer by reason of the fact that the inner portion 24 in contact with the insole 12 is soft and porous and the sole and heel unit as a whole is comparatively light in weight.

Having thus described my invention, what I claim as new and desire to secure by Letters Patent of the United States is:

1. That method of making shoes which comprises molding on a lasted shoe bottom a complete integral outsole having a dense tread surface and a cellular insole attaching surface, such molding being effected in only one vulcanizing cycle comprising the following steps: placing in the mold cavity of a machine for molding and vulcanizing outsoles onto shoe bottoms a charge of rubber composition including a blowing agent, supplying vulcanizing heat to the charge through the walls and the base of the mold cavity, holding the charge against expansion during an initial period sufficient in duration partially to vulcanize those portions of said charge adjacent to the walls and the base of the mold cavity, and sufficient in duration to cause decomposition of the blowing agent in those portions of the charge adjacent to the walls and the base of the mold cavity without any significant expansion of the charge, and sufficient in duration to raise the temperature of the inner portion of said charge to a degree sufficient for at least partial decomposition of the blowing agent, thereafter but before complete vulcanization enlarging the mold cavity heightwise of a shoe in the machine to liberate gases from the blowing agent in the interior portion only of the charge thereby to form a cellular structure in said inner portion and thus to enlarge the charge to fill the enlarged mold cavity while maintaining the relatively dense character of the outer portion of the charge.

2. That method of making shoes which comprises molding on a lasted shoe bottom a complete integral outsole having a dense tread surface and a cellular insole attaching surface, such molding being effected in only one vulcanizing cycle comprising the following steps: placing on the bottom mold member of a machine for molding and vulcanizing outsoles onto shoe bottoms a charge of rubber composition including a blowing agent, arranging a shoe form having a lasted shoe mounted thereon to close the mold cavity, advancing the bottom mold member thereby to bring the unvulcanized charge into intimate contact with the shoe bottom, supplying vulcanizing heat to the charge through the bottom mold member and a plurality of side mold members, holding the bottom mold member against retraction during an initial period sufficient in duration partially to vulcanize those portions of said charge adjacent to the inner surfaces of the mold members, and sufficient in duration to cause decomposition of the blowing agent in those portions of the charge adjacent to the inner surfaces of the mold members without any significant expansion of the charge, and sufficient in duration to raise the temperature of the inner portion of said charge so as to cause at least partial decomposition of the blowing agent, at the end of said initial period but before complete vulcanization moving the bottom mold member in a direction to enlarge the mold cavity heightwise of the shoe thereby to liberate gases from the blowing agent in the interior portion only of the charge thus to permit the inner portion of the charge to expand in order to form a cellular structure therein and in order to enlarge the total charge to fill the enlarged mold cavity while maintaining the relatively non-cellular character of the outer portion of the charge.

3. That method of making shoes which comprises molding on a lasted shoe bottom a complete integral outsole having a dense tread surface and a cellular insole attaching surface, such molding being effected in only one vulcanizing cycle comprising the following steps: placing on the bottom mold member of a machine for molding and vulcanizing outsoles onto shoe bottoms a charge of rubber composition including no more than 1% by weight of a blowing agent, advancing the shoe form of the machine and a lasted shoe mounted thereon to close the mold cavity, supplying vulcanizing heat to the charge through the bottom mold member and a plurality of side mold members while concomitantly advancing the bottom mold member to apply pressure to the charge, maintaining the pressure of the bottom mold member against the charge during an initial period of the vulcanizing cycle sufficient in duration to effect at least partial vulcanization of those portions of said charge adjacent to the inner surfaces of the mold members, and sufficient in duration to cause decomposition of the blowing agent in those portions of the charge adjacent to the inner surfaces of the mold members without any significant expansion of the charge, and sufficient in duration to raise the temperature of the interior portion of said charge to a degree sufficient for at least partial decomposition of the blowing agent, at the end of said initial period releasing the pressure of the bottom mold member against the charge and moving said member in a direction to enlarge the mold cavity heightwise of the shoe to a measured degree thereby to liberate gases from the blowing agent in the interior portion of the charge thus to form a cellular structure in said interior portion and to cause the expansion of the entire charge to fill the enlarged mold cavity while maintaining the relatively non-cellular character of the outer portion of the charge.

4. That method of making shoes which comprises placing a charge in the mold cavity of a sole vulcanizing machine having side mold members and a bottom mold member movable heightwise of a shoe in the machine between the side mold members thereby to apply pressure to the charge in the mold cavity, said charge including in its components a suitable blowing agent, advancing the bottom mold member heightwise of the shoe between the side mold members to apply pressure to the charge in the mold cavity and to bring the charge into intimate contact with the bottom of a lasted shoe arranged to close the top of the mold cavity, applying vulcanizing temperature to the charge through the side mold members and the bottom mold member for an initial period with the bottom mold member in its advanced position thereby to cause a partial vulcanization of the outer portion of the charge contiguous to the side mold members and the bottom mold member thus to form a relatively dense non-cellular outer portion of substantial thickness without heating the inner portion of the charge to vulcanizing temperature, and thereby to cause decomposition of the blowing agent in those portions of the charge contiguous to the inner surfaces of the mold members without any significant expansion of the charge, after the expiration of the initial period of the vulcanizing cycle moving the bottom mold member downwardly while vulcanizing temperature is maintained in the mold cavity, maintaining the vulcanizing temperature for an additional period thereby to bring the inner portion of the charge to vulcanizing temperature while the downward movement of the bottom mold member liberates the blowing agent in the inner portion only of the charge to cause the charge to expand and fill the enlarged mold cavity while the outer portion is still sufficiently plastic to permit the increase of its dimension heightwise of the shoe, but without any alteration of its density, and finally to cause the energy of the blowing agent to be fully expended and the outer portion to be developed into a resiliently flexible wear resistant sole structure while the inner portion is developed into a soft, porous highly flexible resilient structure readily conformable to the foot of the wearer of the shoe.

5. That method of making shoes which comprises mounting a lasted shoe on the shoe support of a sole vulcanizing machine having side mold members and a bottom mold member movable heightwise of the shoe between the side mold members, thereby to apply pressure to a charge in the mold cavity, placing in the mold cavity a charge having as one of its components a suitable blowiing agent, advancing the bottom mold member heightwise of the shoe between the side mold members to apply pressure to the charge in the mold cavity and to bring the charge forcibly into contact with the bottom of the shoe, applying vulcanizing temperature to the charge through the side mold members and the bottom mold member during a first stage of a vulcanizing cycle, thereby to cause the blowing agent in those portions of the charge adjacent to the mold members to decompose fully and to expend all of its energy while the bottom mold member is held in a fixed position in order to prevent any expansion of the charge or the occurrence of any visible porosity therein, continuing the first stage of the vulcanizing cycle until decomposition of the blowing agent in the inner portion of the charge has been at least initiated, and during a second stage of the cycle moving the bottom mold member downwardly to a measured extent while decomposition of the blowing agent in the inner portion of the charge is completed, thus causing expansion of that portion of the blowing agent and the occurrence of porosity in the inner portion only of the charge.

References Cited in the file of this patent

UNITED STATES PATENTS

| | | |
|---|---|---|
| 1,955,720 | Rollmann | Apr. 17, 1934 |
| 2,769,205 | Pfleumer | Nov. 6, 1956 |

FOREIGN PATENTS

| | | |
|---|---|---|
| 744,165 | Great Britain | Feb. 1, 1956 |